(12) United States Patent
Scarselli

(10) Patent No.: US 12,657,632 B1
(45) Date of Patent: Jun. 16, 2026

(54) ASSET IDENTIFICATION, REGISTRATION, TRACKING AND COMMERCIALIZATION APPARATUSES AND METHODS

(71) Applicant: Bruno Scarselli, New York, NY (US)

(72) Inventor: Bruno Scarselli, New York, NY (US)

( * ) Notice: Subject to any disclaimer, the term of this patent is extended or adjusted under 35 U.S.C. 154(b) by 0 days.

(21) Appl. No.: 19/252,380

(22) Filed: Jun. 27, 2025

Related U.S. Application Data

(62) Division of application No. 16/429,784, filed on Jun. 3, 2019, now Pat. No. 12,370,622.

(60) Provisional application No. 62/679,814, filed on Jun. 2, 2018.

(51) Int. Cl.
*G06Q 40/06* (2012.01)

(52) U.S. Cl.
CPC ......... *G06Q 40/06* (2013.01); *G06Q 2220/18* (2013.01)

(58) Field of Classification Search
CPC ........................... G06Q 40/06; G06Q 2220/18
USPC .......................................................... 705/59
See application file for complete search history.

(56) References Cited

U.S. PATENT DOCUMENTS

| | | | |
|---|---|---|---|
| 4,467,172 | A | 8/1984 | Enrenwald et al. |
| 9,849,364 | B2 | 12/2017 | Tran et al. |
| 9,992,022 | B1 | 6/2018 | Chapman |
| 2001/0028390 | A1 | 10/2001 | Hayashi |
| 2003/0055413 | A1 | 3/2003 | Altshuler |
| 2006/0117011 | A1 | 6/2006 | Arbel |
| 2006/0196858 | A1 | 9/2006 | Barron |
| 2006/0207976 | A1 | 9/2006 | Bovatsek |
| 2007/0030795 | A1 | 2/2007 | Kikuawa |
| 2011/0095579 | A1 | 4/2011 | Hill |
| 2013/0126573 | A1 | 5/2013 | Hosseini |
| 2013/0183775 | A1 | 7/2013 | Bergmann |
| 2014/0092711 | A1 | 4/2014 | Bagratashvili |
| 2014/0185065 | A1 | 7/2014 | Shah |
| 2016/0085955 | A1 | 3/2016 | Lerner |
| 2016/0098730 | A1* | 4/2016 | Feeney .................. G06Q 20/20 705/71 |
| 2016/0300234 | A1 | 10/2016 | Moss-Pultz et al. |
| 2016/0335609 | A1 | 11/2016 | Jenkins |
| 2016/0342987 | A1 | 11/2016 | Thomas |

(Continued)

FOREIGN PATENT DOCUMENTS

| | | |
|---|---|---|
| CA | 2942229 A1 | 3/2018 |
| IN | 201641015689 | 5/2016 |

(Continued)

OTHER PUBLICATIONS

Smith, et al., Advances in Femtosecond micromachining and Inscription of Micro and Nano Photonic Devices, www.intechopen.com, Feb. 2010.

(Continued)

*Primary Examiner* — Zeshan Qayyum
(74) *Attorney, Agent, or Firm* — Todd A. Serbin; Maynard Nexsen PC

(57) ABSTRACT

A method of tokenization and use of assets, comprising: a) registering at least one asset on a distributed ledger; b) assigning the at least one asset a fungible or non-fungible token with a public key; c) reading information about the at least one asset using a reading device; d) verifying ownership of the at least one asset using a private key which matches the public key; and, e) performing a transaction with the at least one asset.

17 Claims, 9 Drawing Sheets

110    120

(56)                References Cited

U.S. PATENT DOCUMENTS

| | | | |
|---|---|---|---|
| 2017/0330174 A1 | 11/2017 | Demarinis | |
| 2017/0331896 A1 | 11/2017 | Holloway et al. | |
| 2018/0034800 A1* | 2/2018 | Pistauer | H04L 63/0807 |
| 2018/0131927 A1 | 5/2018 | Vora | |
| 2019/0147397 A1 | 5/2019 | Hodges | |
| 2019/0253256 A1 | 8/2019 | Saab | |
| 2019/0279204 A1 | 9/2019 | Norton | |
| 2020/0164470 A1* | 5/2020 | Booth | B23K 26/0626 |
| 2020/0184465 A1 | 6/2020 | Kislev | |
| 2020/0273048 A1* | 8/2020 | Andon | G06Q 10/02 |

FOREIGN PATENT DOCUMENTS

| | | | |
|---|---|---|---|
| JP | 11138896 A | 11/1997 | |
| JP | 2006068762 A | 3/2006 | |
| JP | 20070300333 A | 2/2007 | |
| RU | 2357870 C1 | 6/2009 | |
| RU | 2382122 C2 | 2/2010 | |
| RU | 109877 U1 | 10/2011 | |
| WO | 9725177 A1 | 7/1997 | |
| WO | 0066315 A1 | 11/2000 | |
| WO | 2016205336 A1 | 12/2016 | |
| WO | 2017006092 A1 | 1/2017 | |
| WO | 2019030520 A1 | 2/2019 | |

OTHER PUBLICATIONS

Thesis, "The Role of Focusing in the Interaction of Femtosecond Laser, Pulses with Transparent Material," Harvard University, Jan. 2003.

Copenheaver, The International Search Report and Written Opinion for PCT/US2019/035237, mailed Sep. 2, 2019.

Batista, et al., QR Code Micro-Certified Gemstones: Femtosecond Writing and Raman Characterization in Diamond, Ruby and Sapphire, Scientific Reports, Jun. 20, 2010.

"$5 Million of Coloured Diamonds Launched Under PinkCoin, World's First Diamond Backed Crypto Currency," Precious Investments, Inc., https://globenewswire.com/news-release/2016/01/19/802921/0/en/5-Million-of-Coloured-Diamonds-Launched-under-PinkCoin-World-s-First-Diamond-Backed-Crypto-Currency.html, Jan. 19, 2016.

"Laser Marking By University of Oxford Spinout Transforms Diamond Security," https://www.opsydia.com/29-05-2018-Opsydia-Press-Release.html, May 29, 2018.

"Alphapoint Blockchain Fintech Company Alphpoint," https://globenswire.com/news-release/2018/05/14/1502005/0/en/Blockchain-FinTech-Company-AlphaPoint-Announces-Regulated-Asset-Backed-Token.html, May 14, 2018.

Sotillo, et al., "Diamond Photonics Platform Enabled by Femtosecond Laser Writing," Scientific Reports, Oct. 17, 2016.

"MICROBESCOPE," http://microbescope.com/, 2017.

"About Cedux," https://web.archive.org/web/20180512004336/https://cedex.com/, May 20, 2012.

Davis, et al., "Writing Waveguides in Glass with a Femtosecond Laser," Opt. Lett. 21, pp. 1729-1731, Nov. 1, 1996.

Yoshino, et al., "Micromachining with a High Repetition Rate Femtosecond Fiber Laser," Journal of Laser Micor/Nanengineering, pp. 1-6, vol. 3, No. 3, 2008.

Wort et al., "Diamond as an Electronic Material," Materials Today, Jan.-Feb. 2008, vol. 11, No. 1-2.

Mearian, "De Beers and other jewelry industry giants create blockchains to verify gems," https://web.archive.org/web/20180510230245/https://www.computerworld.com/article/3269440/blockchain/de-beers-and-other-jewelry-giants-create-blockchains-to-verify-gems.html, May 10, 2018.

Gattass, et al., "Femtosecond laser micromachining in transparent materials," Nature Photonics, Apr. 2008, pp. 219-225, vol. 2.

* cited by examiner 110    120

ASSET IDENTIFICATION, REGISTRATION,
TRACKING AND COMMERCIALIZATION
APPARATUSES AND METHODS

RELATED APPLICATIONS

This application claims the benefit of priority under 35 USC § 120 of U.S. patent application Ser. No. 16/429,784 filed on Jun. 3, 2019 and is related to U.S. Provisional Patent Application Ser. No. 62/679,814 filed Jun. 2, 2018, the contents of which are incorporated herein by reference in their entireties.

FIELD AND BACKGROUND OF THE
INVENTION

The present invention, in some embodiments thereof, relates to asset management and utilization and, more particularly, but not exclusively, to management of assets such as precious stones.

Laser direct writing, for example with femtosecond duration laser pulses, define a methodology for generating various types of photonic devices internally in bulk transparent materials, with laser interactions confined in or near the laser focal volume. In this way, three-dimensional (3D) photonic devices may be fabricated. Various types of femtosecond lasers may be used to alter the refractive index of transparent materials, for example, to create buried optical waveguides.

For example, see U.S. Pat. No. 5,656,186 to Mourou, et al., which describes ultrashort laser interactions with materials and "Writing waveguides in glass with a femtosecond laser," by Davis et al, Opt. Lett. 21, 1729-1731 (1996) which discloses a method of forming buried optical waveguides with ultrashort duration lasers. U.S. Pat. No. 6,977,137 to Borrelli et al. discloses femtosecond laser writing of refractive index changes in three dimensions and various devices.

Such ultrashort laser writing of optical circuits is promising as a fabrication method for creating compact optical circuits by forming devices in multi-layers or other geometries exploiting the full 3D physical space in comparison to planar light circuits (2D) or fiber optics (1D). Various devices such as power splitters, directional couplers, and multi-mode interference (MMI) power splitters are possible. By focusing femtosecond laser pulses with an optical microscope objective beneath the surface of synthetic diamond, buried optical waveguides were recently demonstrated by scanning the asset/sample relative to the laser using computer controlled motion stages: Eaton et al. "Diamond photonics platform enabled by femtosecond laser writing" Scientific Reports volume 6, Article number: 35566 (2016).

Additional background art includes U.S. Pat. No. 9,849,364 to Tran, et al., CA2942229 to Davies, WO2016/205336 to Kirsch, and US2016/0085955 to Lerner.

SUMMARY OF THE INVENTION

According to an aspect of the invention, there is provided a method of tokenization and use of assets, comprising: a) registering at least one asset on a distributed ledger; b) assigning the at least one asset a fungible or non-fungible token with a public key; c) reading information about the at least one asset using a reading device; d) verifying ownership of the at least one asset using a private key which matches the public key; and, e) performing a transaction with the at least one asset.

In an embodiment of the invention, the method further comprises tagging the at least one asset prior to the registering.

In an embodiment of the invention, the method further comprises rating an individual or entity responsible for tagging the at least one asset based on at least one of trustworthiness, accuracy and honesty.

In an embodiment of the invention, the non-fungible token includes information related to at least one of the at least one asset's characteristics, ownership, provenance, location and past transactions.

In an embodiment of the invention, ownership information includes fractional ownership of the at least one asset.

In an embodiment of the invention, a transaction includes primary purchases of the at least one asset, secondary market trading of the at least one asset, collateralized lending, insurance, law enforcement, verification of the at least one asset and certification of the at least one asset.

In an embodiment of the invention, the reading is performed in the performance of a transaction including primary and secondary sales, use as collateral, monetization, investment, insurance, finance, logistics, chain of custody, verification, validation, certification, grading, law enforcement, brand enforcement, asset theft prevention, counterfeiting protection, asset recover, commoditization, and trading.

In an embodiment of the invention, the tagging, comprises modifying the asset with a laser beam from a laser system using gentle modification with a pulse energy between 10 nJ and 300 nJ, the identification etching which is imperceptible at 10× optical magnification but visible to high magnification optical viewing methods; and, communicating and registering information related to the laser-written identification etching on the distributed ledger.

In an embodiment of the invention, modification of the asset consists of multi-photon absorption by the asset.

In an embodiment of the invention, modifying the asset with the laser to create the identification etching within the asset includes operating the laser at a wavelength such that the photon energy is less than the bandgap energy of the material to ensure nonlinear absorption.

In an embodiment of the invention, modifying the asset with the laser to create the identification etching within the asset includes creating the identification etching using a wavelength is in the range of 1020-1050 nm or is in the second harmonic wavelength in the range of 510 to 525 nm.

In an embodiment of the invention, modifying the asset with the laser to create the identification etching within the asset includes tagging the asset with a laser using microscope having an objective with a numerical aperture between 0.25 and 1.5 to create the identification etching within the asset.

In an embodiment of the invention, modifying the asset with the laser to create the identification etching within the asset includes creating a localized two or three dimensional modification within a depth between 100 microns to 200 microns, or between 200 microns to 500 microns of below a surface of the asset.

In an embodiment of the invention, modifying the asset with the laser to create the identification etching within the asset includes forming a two-dimensional or three-dimensional pattern from voxels having a width of less than 1 micron.

In an embodiment of the invention, modifying the asset with the laser to create the identification etching within the asset includes forming a two-dimensional or three-dimensional pattern or graphic design.

In an embodiment of the invention, modifying the asset with the laser to create the identification etching within the asset includes forming a two-dimensional or three-dimensional pattern indicative of a numerical code, text, a graphic, a logo, or a pattern associated with a particular company.

In an embodiment of the invention, modifying the asset with the laser to create the identification etching within the asset includes forming a two-dimensional or three-dimensional pattern indicative of a current physical location or a past physical location of the asset.

In an embodiment of the invention, modifying the asset with the laser to create the identification etching within the asset includes forming a two-dimensional or three-dimensional pattern indicative of a current owner or past owner of the asset.

In an embodiment of the invention, modifying the asset with the laser to create the identification etching within the asset includes forming a two-dimensional or three-dimensional pattern indicative of a previous transaction involving grading details or certification details associated with the asset.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
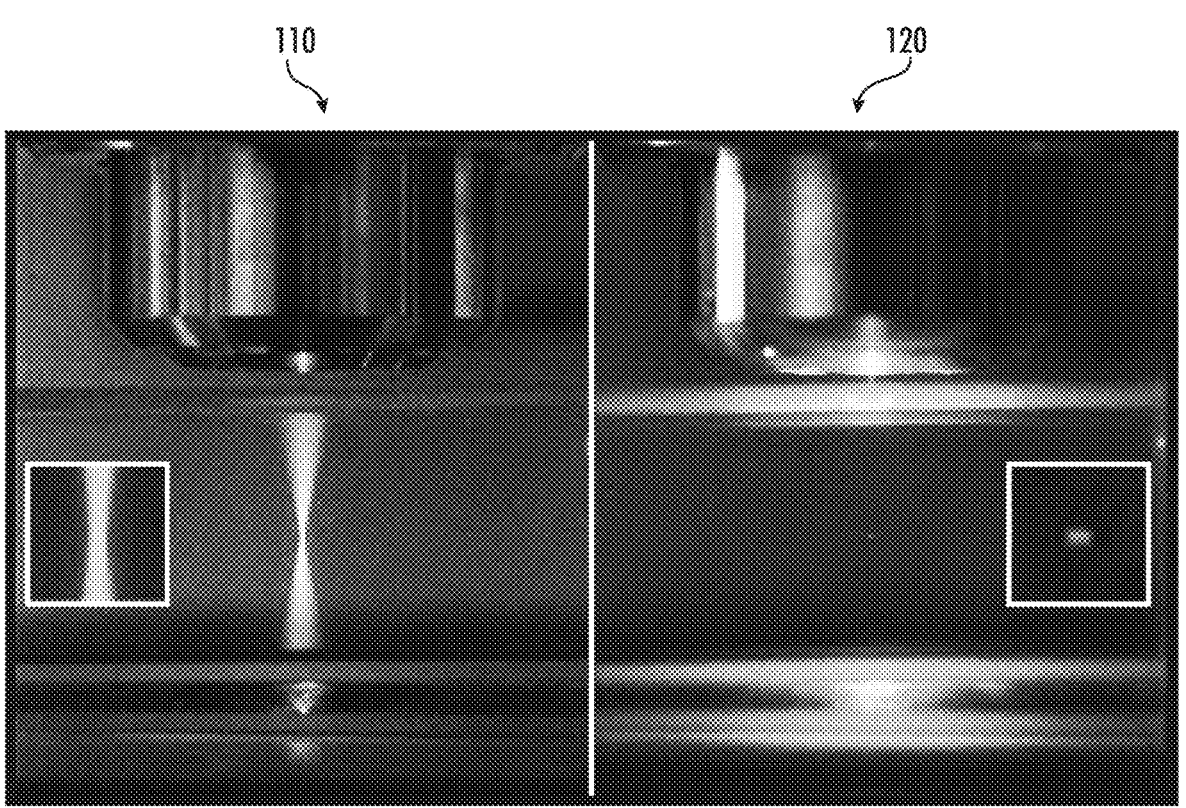
FIG. 1 is a schematic depicting linear single photon absorption and nonlinear multi-photon absorption, demonstrating that multiphoton absorption can lead to smaller modified volumes than linear absorption.

The present invention, in some embodiments thereof, relates to asset management and utilization and, more particularly, but not exclusively, to management of assets such as precious stones.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

According to the present invention there is provided, in broad terms, a method (and related hardware) comprising: a) tagging an asset, such as a gem, transparent or translucent material, polymer, precious stone or crystal, or other assets such as rare books, automobiles, antiques, and other collectibles, with identifying information, where the tagging comprises modification of the asset's structure at a desired location using a tagging unit; b) registering/recording the identifying information, for example using blockchain technology; c) subsequent reading of the tag/identification using reading device, such as an automated optical reader like a zoom-capable camera, smartphone, mobile device or microscope; d) optionally updating the recorded information, for example by updating the blockchain, based on transactions and/or changes in information relevant to the asset; e) optionally leveraging the integrity/reliability/infallibility of the recorded identifying information of the asset to commercialize and/or otherwise derive benefit from the asset;

and wherein many method action steps further include translation/encryption/decryption/processing stages using hardware and/or software.

Generally, it is conceived that asset recorded blockchain registration information will be read via a reading device (such as a smartphone or other portable reader), optionally utilizing a cloud-based or Internet-based process, and/or using artificial intelligence (AI), and/or image recognition methods.

The tagging of the asset consists of a gentle and localized modification of the asset material through the absorption of a focused laser pulse. The modification is localized to within the focal volume of the lens used to focus the laser. This localized modification or "voxel", may have a width of less than 1 microns and a vertical extent of less than 2 microns. Related, but different, methods are described in WO2017/006092 to Oxford University Innovation, Ltd, the disclosure of which is incorporated herein in its entirety.

The method may include modification of the gem (or other asset) through nonlinear multiphoton absorption.

The method may include using a pulsed laser, optionally using only a single (i.e. not repetitive) pulse of the laser.

The method may include a laser with a nominal wavelength such that nonlinear absorption occurs instead of single photon linear absorption. The deposition of laser energy will therefore proceed by the simultaneous absorption of multiple photons, so that the summed energy of the photonics is greater than or equal to the bandgap energy of the gem.

In this way, the volume of the laser-induced modification is reduced since nonlinear absorption occurs only in a volume where the intensity of the laser is greater than the threshold intensity for nonlinear absorption.

This laser wavelength may the range of 1020-1050 nm, compatible with low-cost and reliable Yb-based femtosecond laser technology. Additionally, alternatively and/or optionally, the second harmonic wavelength (wavelength in the range of 510 to 525 nm) may be applied for slightly higher patterning resolution.

The microscope objective used for laser tagging may have a numerical aperture between 0.25 and 1.5.

The repetition rate of the laser may be between 1 kHz and 10 MHz, although in some embodiments, only a single laser pulse will be used (obtained with a commercially available pulse picker) for the laser written of a voxel making up the identification tag.

The pulse energy of the laser may be varied between 2 nJ and 1000 nJ to obtain a gentle modification of them gem that can only be visible with high optical magnification (>10×-100×) read out. Optionally, the energy is between 2 nJ and 14 nJ. Optionally, the energy is between 15 nJ and 150 nJ. Optionally, the energy is between 40 nJ and 125 nJ. Optionally, the energy is between 50 nJ and 100 nJ.

In some embodiments, the present description relates to micrometer-sized, optionally buried, identification tags laser written using moderate pulse energy (in some embodiments, between about 15 nJ to about 150 nJ) in diamonds, crystalline materials and other gems, or other assets, followed by their read-out using an optical reader. Optionally, the optical reader is automatic. Optionally, the optical reader is manually operated. Optionally, the optical reader is partially automatic and partially manually operated. By focusing a femtosecond pulse laser beam (with a pulse duration less than 1 ps, in some embodiments) with a high magnification microscope objective into a transparent gem, stone or crystalline material such as a diamond (e.g. clear, colored, artificially-created), a micrometer-sized increase in the refractive index can be achieved compared with the unprocessed material. Selection of appropriate laser exposure parameters (pulse energy, pulse repetition (could be just a single pulse), exposure time, depth, focusing objective, and/or wavelength) can be used to achieve a gentle refractive index modulation that is invisible or imperceptible to known optical inspection and certification/grading methods (magnification 10×), such as those employed by the Gemological Institute of America (GIA). However, such a modification would be designed to be visible to high magnification optical viewing methods (40×), such as microscopy, used in the reader proposed in this disclosure.

The method may include the step of modifying the gem or other asset by directing a focused laser at a specific depth below the surface, instead of on the surface.

The step of modifying the gem may include the localized modification of the gem at a depth of between 10 microns and 200 microns. In some embodiments, the modification depth will be in the range of 200 to 500 microns for added security.

The method may include the choice of the pulse energy just above the damage threshold, so that the mark is visible under high magnification (for example, 40×) but invisible under GIA (or other agency) standard 10× magnification, thus not degrading the value of the gem. For a given material, focusing lens and tagging depth, an initial study may be carried out on a sacrificial gem where the pulse energy is finely varied from just below to just above this damage threshold. Then, subsequent marking of other diamonds can be performed with this optimum pulse energy, optionally 10% greater than the damage threshold identified using 100× optical microscopy.

The laser modification volume may have a width of less than 1 microns and a vertical extent of less than 2 microns. Optionally, these distances are greater or less, for example depending on pulse duration and/or energy and/or material being modified. In some embodiments, the modified volume of the gem will have a width of less than 500 nm and a vertical extent of less than 1 microns to enable the maximum density in laser tagging.

The pulse duration may be shorter than the characteristic time for heat diffusion of the material to avoid excessive heating. The duration of the laser pulse may be between 1 femtosecond and 10 picoseconds. The pulse duration may be about 300 femtoseconds. This pulse duration optionally depends on the material being processed/etched.

The method may comprise forming a two-dimensional or three-dimensional pattern of static laser exposures below the surface of the gem. Such two-dimensional or three-dimensional patterns of isolated laser-formed voxels will make up the desired tagging pattern. These patterns can be generated by translating the laser focus with respect to the asset.

The method may be a writing step in the fabrication of an embedded tag used to securely identify the gem, compatible for registration with blockchain technology.

The method may include the hardware/software interface for automatically reading out the laser-formed tag using an optical reader, such as a 40× magnification optical microscope, for integration with blockchain technology.

The asset may be a diamond, a crystalline structure, a transparent or translucent material, any precious gem, or any other material or substance referred to herein or conceivable to one of ordinary skill in the art, whether naturally occurring or man-made. It should be understood that in some embodiments of the invention, the laser tagging imperceptibly alters the asset at certain magnifications, but is still perceptible at high magnifications. The method may include the step of modifying the gem by focusing pulsed laser below the surface of them gem at a specific region, as described above. The step of gently modifying the gem may include modifying it at a certain depth, as described above. The method may include the selecting a laser pulse energy just above the damage threshold, as described above. The laser-modified volume of the gem may have a transverse and vertical extent of 1 micrometers and 2 micrometers, respectively, as described above. It should be understood that the transverse and/or vertical extent could be larger or smaller than 1 micrometers and 2 micrometers, respectively. As examples only, as small as 0.25 micrometers and as large as 10 micrometers. The method may comprise forming a two-dimensional or three-dimensional pattern of laser written voxels, as described above. The method may be a fabrication step or tag required for securely identifying a gem, to be read out using an optical reader, for example using high magnification optical microscopy with customized software and/or hardware, for integration with the blockchain for tracking transactions related to the specific identification and/or information assigned to the physical asset (gem, crystalline material, diamond, etc.) etched with an identification tag by the laser.

Thus, the present invention, at least in some embodiments, may be seen to provide a method for modifying an asset which enables:

(i) Creation of an identifying etching, for example faint laser written voxels, a bar code, a QR code, and/or the like, within the volume of a gem or on/in some other asset. Variation of the laser average power, pulse duration, and beam shape enables control over the morphology of these voxels, which are the basic elements used to form a security tag, in an embodiment of the invention.

(ii) High positional accuracy and small spatial distribution of modifications in three dimensions within the gem. The gem is altered where the intensity of the laser pulse is greater than the threshold for nonlinear multi-photon absorption, in an embodiment of the invention.

(iii) Creation of voxels at arbitrary points within the gem, only limited by the working distance of the focusing lens, in an embodiment of the invention.

(iv) Rapid creation of complex 2D and 3D patterns using computer-controlled stages to translate the asset relative to the laser or a galvanometric scanner to translate the laser beam relative to the asset.

Referring now to the drawings, FIG. 1 demonstrates the advantage of applying ultrashort laser pulses (1 fs to 10 ps) compared to longer (greater than 10 ps) or continuous wave lasers in terms of 3D patterning resolution in transparent materials (which in an embodiment of the invention, the material would be that of an asset). Two different laser beams are focused by a microscope objective focusing lens into a dial containing a fluorescent dye. On the left, a continuous wave (not pulsed) laser 110 with 400-nm blue wavelength is focused, causing linear absorption in the liquid dye which absorbs at blue wavelength. The absorption can be seen by the subsequent fluorescence in the dye, occurring wherever the focused beam is, limiting the spatial resolution of the laser interaction. On the right, a longer wavelength 800 nm near-infrared laser 120 with ultrashort laser pulses is focused into the same transparent dye. Although this wavelength is too long for linear absorption, a nonlinear effect known as multiphoton absorption occurs. In this case, two photons combine their photon energy to bridge the bandgap of the transparent material to cause nonlinear multiphoton absorption. As this effect only occurs for intensities above a certain threshold, the interaction may be confined to a volume (for example, <1 micrometer) 3 smaller than the focal volume of the laser. This fact enables 3D high resolution patterning using focused ultrashort laser pulses.

Figure 2:
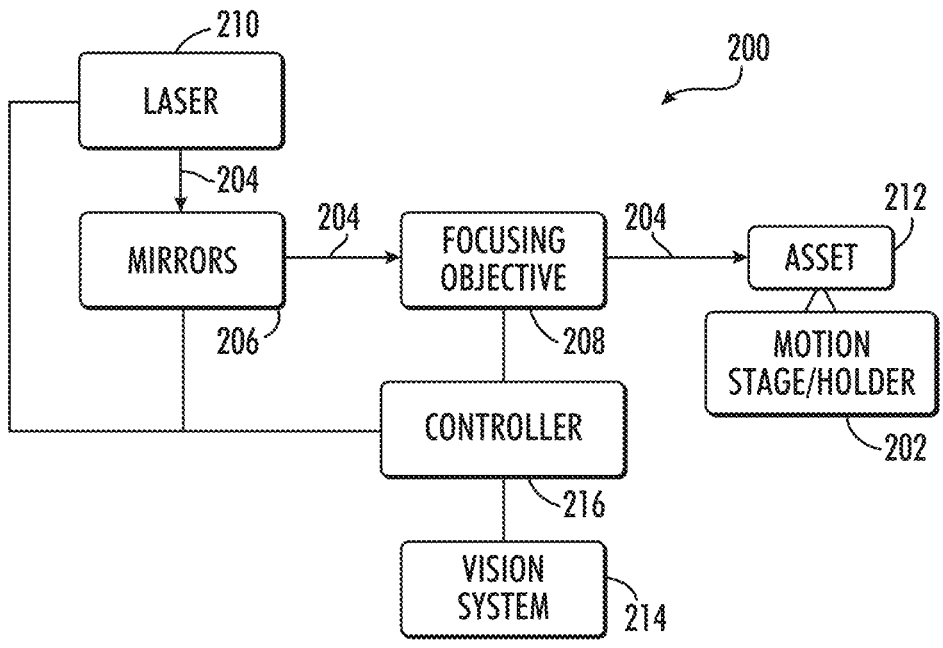
FIG. 2 is a schematic of a laser system which could be used for writing micrometric voxels within a gem using 3D computer-controlled motion stages to move the asset/sample with respect to the beam.

FIG. 2 shows a schematic of a laser system 200 which can be used for writing micrometric voxels within or on an asset 212 using 3D computer-controlled motion stages 202, controlled by a controller 216 or computer, to move the asset with respect to the beam 204. It should be understood that this is system configuration is by way of example only, and that any configuration which provides operational parameters such as described herein could be used. Several mirrors 206 are used to direct the laser beam 204 towards the final focusing lens 208, in an embodiment of the invention. The laser power may be varied using a half-wave plate and a polarizer. By varying the half-wave plate angle with a rotation stage interfaced with the controller/computer 216, the laser power may be varied in an automated fashion for achieving the desired laser power at the asset. Automated software interfaced with a vision system 214 (such as CCD) can be used to place the focused laser beam on the top surface of the transparent asset, which is used as a reference point for subsequent internal modification. Tagging/etching is achieved by translating the asset with respect to the stationary incident laser beam. To modulate the power of the laser 210 on and off, an internal or external mechanical shutter or high speed acousto-optic modulator may be applied, interfaced with the computer/controller 216.

Figure 3:
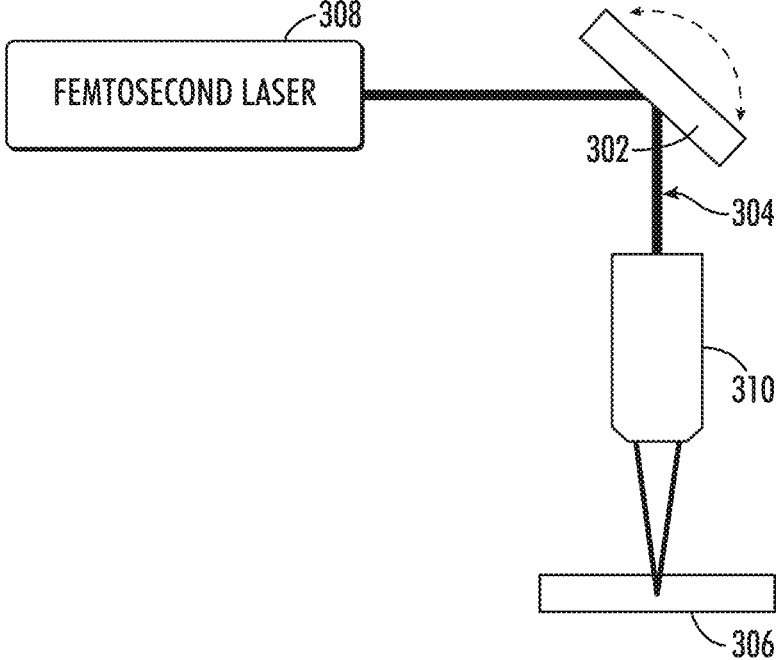
FIG. 3 is a schematic of a laser system which could be used for writing micrometric voxels within a gem using a galvanometric mirror to move the beam with respect to the asset/sample.

FIG. 3 shows a simplified schematic of a laser system 300 which could be used for writing micrometric voxels within a gem using a galvanometric mirror 302 to move the beam 304 with respect to the asset 306 (the "Sample"). The system is the same as that used in FIG. 2 except that the laser beam 304 (and optionally the focusing objective 310) is moved with respect to the asset instead of the other way around. Optionally, the laser 308 and the asset 306 are moved in combination.

Figure 4:
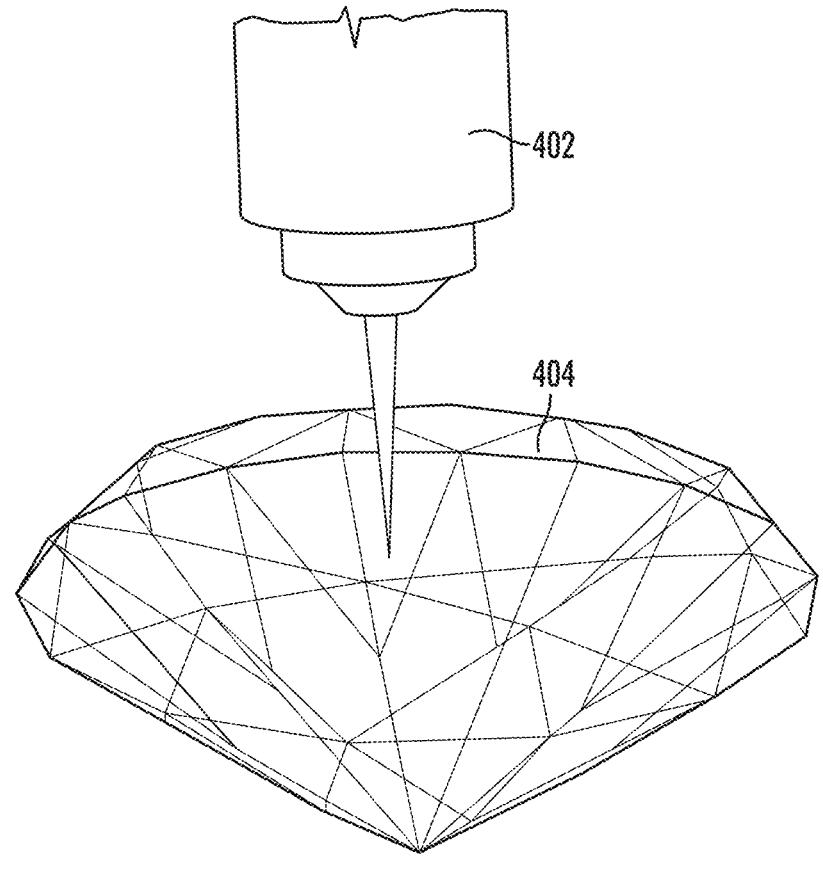
FIG. 4 is a schematic of a single laser modified voxel within a gem.

FIG. 4 shows a schematic of a single laser 402 modified voxel within a gem 404 such as a diamond. This laser modification volume may have a width of less than 1 microns and a vertical extent of less than 2 microns, in an embodiment of the invention. It should be understood that the volume could be larger or smaller.

Figure 5:
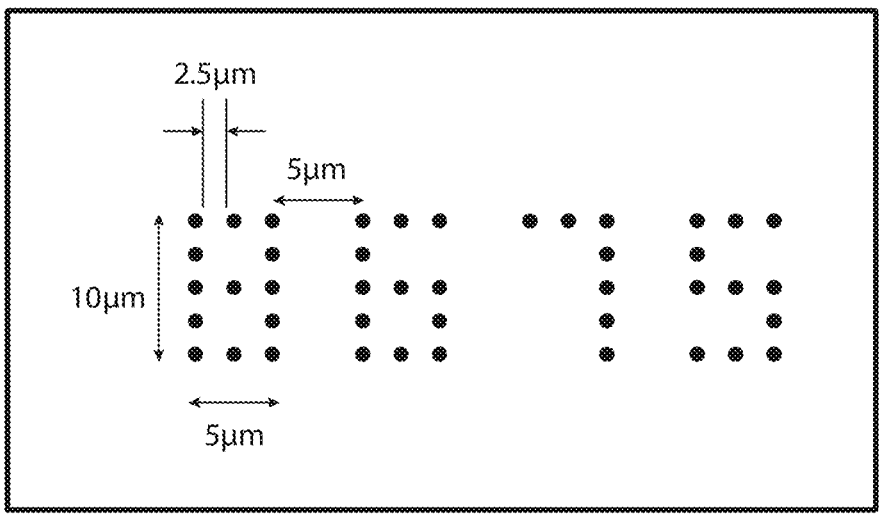
FIG. 5 is a schematic of a 3D pattern of laser modified voxels, to be used as an identification tag during read out with an optical microscope.

FIG. 5 shows the top view schematic of a 3D pattern of laser modified voxels written below the surface of a gem. In this case, a simple pattern of digits "8675" is fabricated, with each digit made up of laser-formed voxels spaced by 2.5 micrometers. Note that the overall transverse size of each voxel is 1 micrometer×1 micrometer. Each digit covers an overall area of 10 micrometers×5 micrometers and there is a spacing of 5 micrometers between pixels. It should be understood that these dimensions are by way of example only, and could be larger or smaller. The laser written tag may be used as an identification tag during read out with an optical reader, such as a microscope or high-resolution camera. In an embodiment of the invention, the modification is invisible using 10× magnification. It should be understood that instead of voxels, other patterns could be etched by the laser for identifying the asset, for example graphics/logos, bar codes, QR codes, text, and the like. In some embodiments, the tag is comprised of a number or is alphanumerical or and/or includes symbols. In addition, the dimensions of the etching given with respect to FIG. 5 are by way of example only, and virtually any height, spacing, length, width could be used. Further, while the numerical tag shown in FIG. 5 is largely two dimensional, three dimension tags (in x, y and z axes) could be used.

Figure 6:
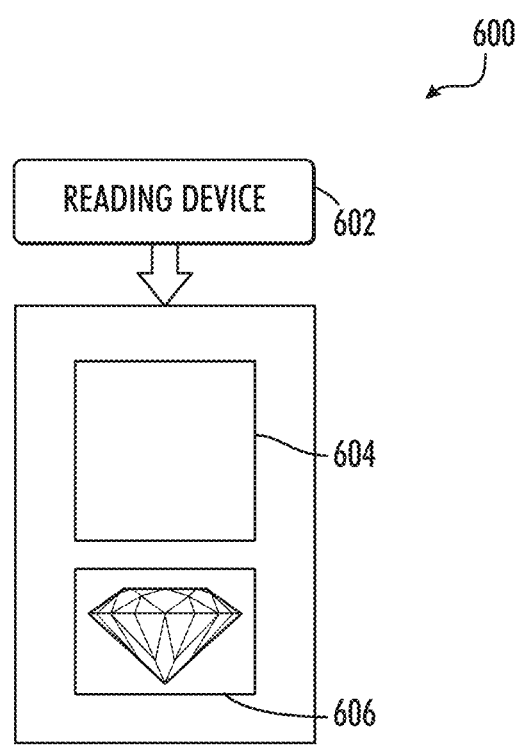
FIG. 6 is a schematic of an optical reader, with dedicated hardware and software for automatically locating and identifying the laser written tag.

FIG. 6 shows a schematic 600 of an exemplary optical reader 602, with dedicated hardware and/or software for automatically locating and identifying the laser written tag. The gem is optionally placed in an asset holder 606 configured to provide automated z-axis motion to bring the buried laser-written tag into focus for the magnification lens 604 and CCD camera. Optionally, the lens magnifies greater than 10×. Optionally, the lens magnifies 20× or greater. Optionally, the lens magnifies 40× or greater. Optionally, the optical reader 602 is moved closer or farther from the asset in order to perform the reading (i.e. in the z-axis). Optionally, the asset and the reader both move to bring the tag into focus for reading. In some embodiments of the invention, the holder 606 is also provided with motion, optionally automated by the holder 606 being controlled by a controller, in the x and y axes. The CCD image of the laser-written tag is interfaced with hardware and/or software for compatibility with blockchain technology. It should be understood that 40× magnification is by way of example only and the magnification level could be more or less. Further, it should be understood that the reader could be of any of the device types described herein, such as a mobile device, smartphone, microscope or the like.

In an embodiment of the invention, the reading device is a smartphone which uses a physical magnification enhancer, such as conceived by the MicrobeScope™ product offered by 4D Optical, LLC. While this device is intended to examine biological specimens, in embodiments of the invention, it can be used for reading asset tags such as described herein. Another physical augmentation solution is the Micro Phone Lens developed by Thomas Larson and offered by Micro Phone Lens on the Shopify platform. In an embodiment of the invention, lighting sources are provided to the system in order to assist with reading, for example of varying wavelengths of light, at varying intensities, at varying locations with respect to the asset and/or which are moveable by the controller during reading to maximize readability of the tag. Optionally, light shielding is used to enhance the reading efficiency (for example, to remove extraneous and/or unwanted light from the asset). Additionally, alternatively and/or optionally relative to the physical optical enhancements, software and/or AI is used to augment the inherent optical abilities of the mobile device/smartphone.

Figure 7:
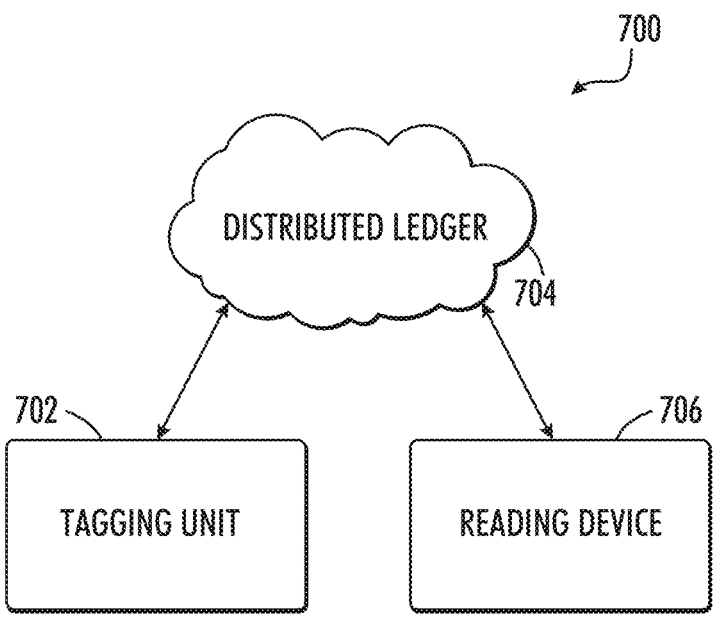
FIG. 7 is a schematic of a system for asset identification, registration, tracking and/or commercialization.

FIG. 7 is a schematic of a system 700 for asset identification, registration, tracking and/or commercialization, in accordance with an embodiment of the invention. As described elsewhere herein, an asset is tagged with identifying information. In an embodiment of the invention, this tagging is performed by a tagging unit 702 configured to modify the structure, or even surface, of the asset using a laser. The tagging unit comprises a laser, using operational parameters such as described herein or in related disclosures such as WO2017/006092, whose operation is directed by a controller and wherein the tagging unit also optionally uses a hardware based encryption/translation operationally linked to corresponding decryption/translation hardware in a reading device. Exemplary tagging unit 703 configurations are also described with respect to FIGS. 2-4 herein. In some embodiments, software is used instead of or in addition to hardware based encryption/translation. In some embodiments of the invention, software is used to provide the various components of the system are programmed to cooperate through software (such as program code, web-based interfaces, mobile app and/or API).

In some embodiments, at least one component used in the tagging is not physically integrated with the tagging unit, for example the controller and/or encryption/translation processing could be located externally (but for the purposes of this description is still considered to be a part of the "tagging unit"). In some embodiments, instead of or in addition to hardware based encryption/translation, software installed on an external device, like a computer, is used for providing encryption/translation.

In some embodiments of the invention, the tagging unit is configured, for example using a hard-wired and/or wireless connection, for operative communication with a global communications network, such as the Internet or World Wide Web. Wireless communication includes, but is not limited to, Wi-Fi, Bluetooth, and/or IR. The communications connection is used, for example, to register the tagged identification and/or additional information relevant to the asset with a database, server, and/or distributed ledger system 704, such as blockchain. In some embodiments, at least a part of the database, server, and/or distributed ledger system 704 is local. Additionally, alternatively and/or optionally, database, server, and/or distributed ledger system 704 is remotely located and/or is located in a "cloud" type network.

The reading device 706 is configured with hardware and/or software for decrypting/translating registered identification and/or related information retrieved from the distributed ledger about an asset read/scanned by the reading device. In an embodiment, the reading device's hardware and/or software is operationally corresponded to the tagging unit's identification/information output registered with the distributed ledger such that the reading device's hardware and/or software is required to successfully and/or usefully retrieve the asset's identification/information from the distributed ledger. In some embodiments of the invention, the reading device is optically based, for example comprising a microscope, a mobile device (such as the camera of a smartphone or even an optical reading device attached to a smartphone or tablet) and/or a zooming camera. The reading device could be a dedicated, specifically-purposed reader or could be multi-purpose hardware (such as a tablet, smartphone or mobile communication device) programmed with software which programs the multi-purpose hardware with operationally sensitive parameters, such as scanning depth and/or magnification and/or optical character recognition and/or bar/QR code-type reading, for reading the identification etched into the asset. In some embodiments of the invention, the reading device is sized and/or shaped to be hand held. As with the tagging unit, in some embodiments certain components and/or functions are performed externally to the reading device, but for the purposes of this description are still considered as a part of the "reading device".

In some embodiments, instead of a reading device being used, the identification is optically and/or manually retrieved and entered into a user-interface, such as a website and/or through a web-based browser/interface, for verifying asset identification and/or retrieving related asset information.

Figure 8:
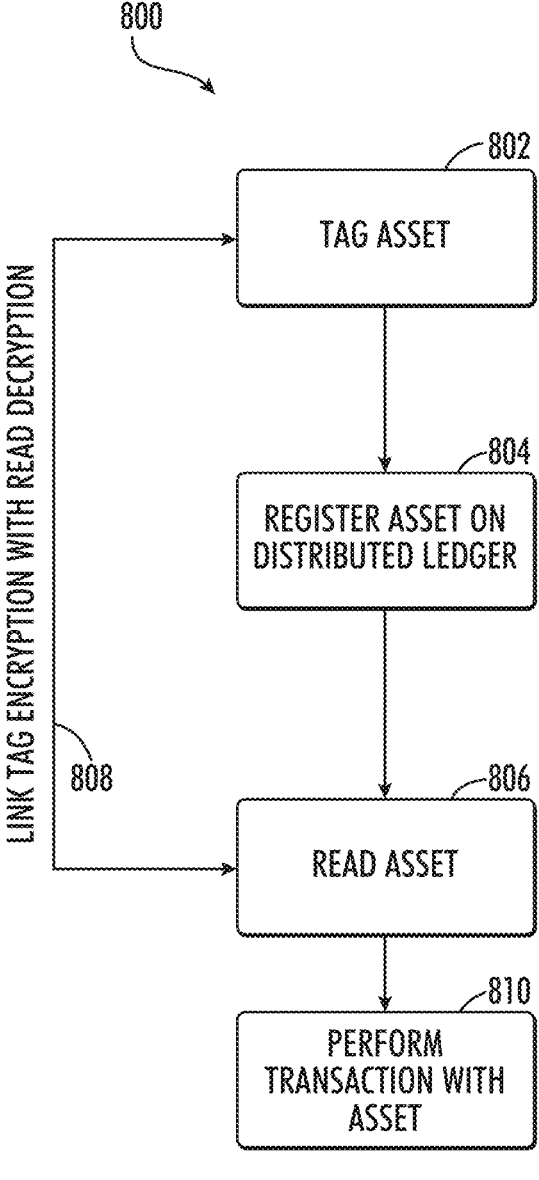
FIG. 8 is a flowchart of a method of using a system for asset identification, registration, tracking and/or commercialization; and, FIG. 9 is a flowchart of an exemplary asset tokenization and use method.

FIG. 8 is a flowchart 800 of a method of using a system for asset identification, registration, tracking and/or commercialization, such as described with respect to FIG. 7. As described elsewhere herein, an asset is tagged (802) by a tagging unit with identification and/or other information, optionally etching the identification/information into the structure of the asset using a laser. In some embodiments of the invention, the process of tagging also includes encrypting and/or coding and/or translating the identification and/or information such that special decryption and/or decoding and/or translating the identification and/or information is required in order to acquire useful data from the retrieved identification and/or information. Optionally, the encryption/decryption is achieved using hardware or software or a combination thereof. Optionally, the encryption occurs when communicating the newly etched tag for registration (804) with a distributed ledger, where the ledger uses technology such as blockchain. Optionally, a component of encryption/decryption and/or the identification and/or relevant information includes identifiers/codes/internal tracking numbers attributable to different entities relevant to the asset (e.g. mining company, certification lab (such as GIAR, IGI®), verification lab (such as Gübelin®), identification assignment/registration/verification/reading/tracking company (such as Scarselli Diamonds)).

In some embodiments of the invention, identification (806) can be achieved by etching it in a human readable (by using optical magnification devices) and/or machine readable form, such as a number, a bar code, a QR code, and/or the like. Information related to the asset, such as provenance, current and/or past physical locations, current and/or past owners (even as an anonymous owner identified by a code or other similar device), past and/or most recent transactions, grading or certification details, could also be combined, or registered separately but linked, with the identification for registration with the ledger. In some embodiments, the identification and/or information is contributed by a third party, such as a certification lab and/or a authenticity verification lab. It is conceived that the identification of the asset will be immutable; however, information related to the asset could be changed over time. Thus, modifications of the information related to the asset are optionally made by updating the ledger entry for the asset, in some embodiments, using dedicated software and/or hardware for doing so.

In some embodiments of the invention, one aspect of commercialization tied to the presently described systems and methods includes incorporating branding and/or a particular labeling of the asset into the identification and/or related asset information registered with the distributed ledger. For example, the brand (in the form of a numerical code, text, graphic, logo, pattern, etc.) of a particular company could be etched into the asset, optionally forming a part of the identification and/or optionally forming a part of the asset related information.

As described elsewhere herein, a reading device is used to scan the identification etched into the physical asset in order to gather verification of identification and/or related asset information from the ledger. In some embodiments, the reading device is tied by hardware and/or software to the tagging unit, such that decryption of the asset identification/information can only be achieved by a correspondingly linked (808) reading device. In some embodiments, the reading device is a stationary system such as could be found in a gemological lab. In some embodiments, the reading device is portable, for example being a specially-programmed, hand held dedicated reader or a mobile device (tablet, phone, etc.).

It is conceived that the reading device automatically contacts the distributed ledger, for example through a wired or wireless communications connection, in order to retrieve the identification and/or related information of the asset (including optionally decrypting/translating the retrieved data). However, in some situations, the identification is read by the reading device and then a user retrieves the identification verification and/or related information (including optionally decrypting/translating the retrieved data) by inputting the scanned/read identification into a user interface/system which is in operative communication with the distributed ledger.

The ability to reliably track identification and/or information related to a specific physical asset, such as a diamond, enhances the confidence of businesses and the public in the value and traceability of the specific asset. Such an enhancement enables the leveraging (810) of the asset for use in commercial transactions such as sales, use as collateral, monetization, investment, insurance, finance, logistics (e.g. chain of custody) and/or trading and/or for assisting law enforcement (e.g. counterfeiting protection, brand enforcement, asset theft prevention and recovery), wherein any entity (e.g. bank, market, broker, lab, investment house, individual, manufacturer, mining company) within these industries is a potential user of the systems and methods described herein for verification of identification and/or information related to a specific asset.

It should also be understood that the retrieval of identification/information about a particular asset can be restricted/limited depending on the entity requesting the information. For example, some or all of these transactions are optionally conducted anonymously (i.e. the ownership information is anonymized or is left out of the information on the ledger or is filtered out of the information on the ledger at retrieval). Further, different entities related to the asset may have different reference numbers or different information for the same asset and therefore, in an embodiment of the invention, some or all of the identification/information related to a specific asset is provided or not provided depending on the entity requesting the information.

In some embodiments of the invention, use of the distributed ledger (for example, blockchain) provides the additional advantage of allowing the tokenization of tagged assets, to indicate and/or track at least ownership aspects. That is, rights to assets which have been tokenized can be stored and managed on a blockchain network. With this method, tangible assets, such as diamonds and other assets described above, can be divided into small units and/or fractional ownership, increasing their liquidity and enabling more market participants to participate in ownership and/or commercialization of the asset. By tokenizing assets, with each physical asset corresponding to one single token, for example one diamond=one token, tagged assets can be traded like a cryptocurrency, managing their value exchange using smart contracts written on the blockchain. Since each single token will represent a unique asset, the value of each token will be different. The value of each token, if converted into fiat money or cryptocurrency will fluctuate, based on the value change of the asset, independently from fluctuations in fiat currencies or cryptocurrencies.

In some embodiments of the invention, an image of the asset or asset tag is used as a confirming verification and/or in lieu of tag verification using the distributed ledger. For example, the reading device is used to acquire an identifying image of the asset or asset tag (e.g. actual image vs. code reading), additionally or alternatively to reading a tag on and/or within the asset. Optionally, the image is super-high resolution and/or at a magnification sufficient for identification of the asset and/or asset tag. In an embodiment of the invention, the acquired image is compared on a database, optionally remotely, to a verifying image of the asset and/or asset tag. In some embodiments, AI is used to assist with the processing and/or comparison of the acquired image. In some embodiments of the invention, image identification information (which is used for the verifying comparison) is linked to the distributed ledger, for example on the block-chain that also includes the asset's tagging information such as described elsewhere herein.

In an embodiment of the invention, the result achieved from verification/validation of the asset, whether by tag or image or both, is communicated back to the reading device.

Figure 9:
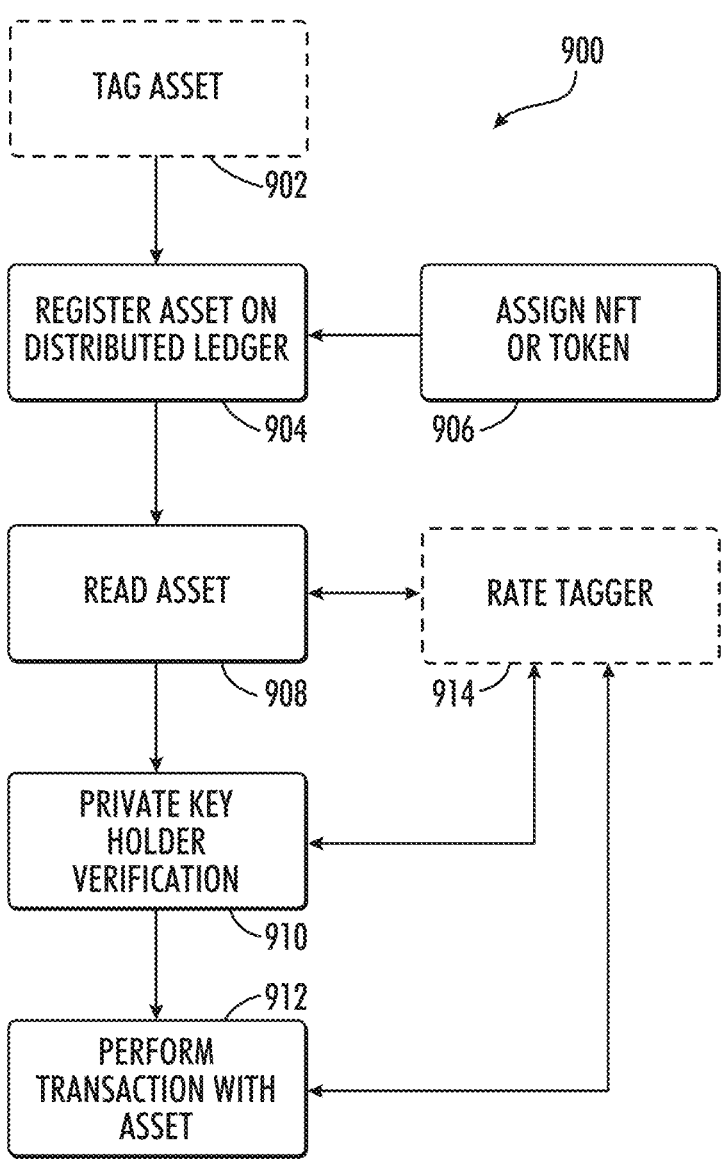

FIG. 9 is a flowchart 900 of an asset tokenization and use method, in an embodiment of the invention. In an embodiment of the invention, assets which are tagged (902), such as using methods described herein, or otherwise identified and then registered (904) on the distributed ledger/blockchain receive (906) a fungible or non-fungible token ("NFT"). In an embodiment of the invention, the NFT can represent any percentage of ownership, including full 100% ownership of the asset to a small fraction of the whole. Using NFTs with respect to tagged assets enables first-sale purchases, second-ary market trading, collateralized borrowing/lending, and insurance markets for the asset, as just some examples of commercialization scenarios. NFTs are already in use in combination with the Ethereum blockchain platform for blockchain games like CryptoKitties. In some embodiments of the invention, a fungible token is used instead of a non-fungible token, especially in cases where the asset is one of any number of similar or identical assets.

A NFT is a unique data entry into a blockchain that is distinguishable from all other data entries. A NFT cannot be interchanged with other data in the same way that, for example, one Bitcoin can be exchanged for any another Bitcoin (as Bitcoins are fungible in nature). Each NFT is unique and identified using a public/private key pair. In one exemplary scenario, the public key is a string of 40 char-acters (e.g. 0x988Ebd2Dc796711F63E91c36cCB7D05E67704b4d) and is mathematically linked to a private key which is a different string of 40 characters.

In an embodiment of the invention, public keys are expressed/tagged on the asset as QR codes or barcodes. Anyone wanting to prove that they own the public key, can sign a message using their private key. The private key is not revealed in the signature process but proves that the signer does in fact control the private key and can transfer the public key (which represents ownership of the diamond) if they so choose.

Once the diamond has been tagged and the NFT issued, then any retail customer (or anyone else in the supply/distribution/commercialization chain) with a camera and internet connection can read (908) the inscribed public key and verify for themselves whatever data has been published to the blockchain (e.g. the diamond's characteristics, place-of-origin, and who attested to those characteristics initially). If the description on the blockchain matches the physical characteristics of the diamond in hand and the seller is able to sign a message proving (910) that they control the public key, then the buyer can know with certainty (at least in part because of information relayed back to the reading device) that the holder of the diamond is the legitimate owner and some transaction can be conducted (912) with a certainty of trust with respect to the asset. This method of on chain tracking gives everyone an ability to see a history of transfer dates, sale prices, place-of-origin, etc. It should be under-stood that diamonds are discussed in the example use above, however, any uniquely identifiable asset (e.g. rare books, automobiles, antiques, coins, stamps, digital/virtual assets like in-game objects, other collectibles) could be used with such a system. Optionally, image recognition is used as an alternative or in addition to tag reading, such as described herein.

This methodology enables all sorts of commercialization scenarios like tagging a public key on a diamond and giving the private key to the owner of the diamond as a certificate-of-ownership. That is, commoditization of unique assets is enabled, which is almost a contradiction in terms. The certificate-of-ownership is what facilitates primary pur-chases, secondary market trading, collateralized lending, and diamond insurance markets. In an embodiment of the invention, a NFT is created so that additional data can be written into the blockchain that is associated with the asset (in this case a diamond) such as cut, clarity, color, place-of-origin, etc. In some embodiments, assets can be grouped together and/or tokenized together as a group, for commer-cial activities. In an embodiment of the invention, this additional data should be accurate and should come from a trusted entity, such as Scarselli Diamonds. Embodiments for weighing and/or establishing "trust" is described in more detail below.

In some embodiments of the invention, a user-accessible portal is created for conducting transactions involving tagged, registered and/or tokenized assets. Users can be, for example, laboratories, banks, insurance companies, govern-mental agencies, retailers, and end-consumers. In an embodiment of the invention, the portal provides and/or receives information related to tagging and/or the assets and enables the verification/validation of this information.

In an embodiment of the invention, reputation of an asset tagger (the person or entity that initially tags and/or registers an asset on the blockchain) is tracked on the blockchain. Taggers which exhibit dishonesty, inaccuracy or other anomalous behavior can be rated (914) and/or stored on the blockchain. It is conceived that a mechanism can be imple-mented to financially punish a dishonest tagger by requiring all taggers to post a bond, which would be at least partially forfeit based on an unsatisfactory reputation rating. As for what the "correct" dollar amount is and under what circum-stances a tagger's bond is forfeited, a model known as a Token Curated Registry (TCR) can be used, in an embodi-ment of the invention. A TCR is a decentrally-curated list with intrinsic economic incentives for token holders to curate the list's contents judiciously. In an embodiment of the invention, the "list" consists of "trusted taggers".

Some repeated, alternative, additional and/or optional software platforms for and uses of the technologies described herein include:

A. Digital Thumbnail of Diamonds non-erasable immutable embedded tagging identifier will be uploaded to the blockchain and diamond tag readers will automatically pull up the digital thumbnail regis-tered on the blockchain Other attributes: Gemological certificate, Picture, Origin, Last Insurance Value, Reference valuation, Ownership Title, Geographical Location, etc.

Flag stolen diamond

Flag diamond if not conflict free certified

Flag diamond if coming from mine that uses child labor

B. API for Diamond Service Providers

Permission based access for suppliers, examples listed herein and below, who can provide services and quotes Insurance Companies Transportation companies Safe deposit box manufacturers Vault services C. B2C Portal Permission based access to sellers to list diamonds avail-able for sale. This will be a Business to Consumer (B2C) portal in some embodiments of the invention, which are not B2B. Diamond brokerage capability for consumers through Scarselli Diamonds or an affiliate.

D. API for Diamond Intelligence Services

Permission based access for diamond verification, including checking for altered or stolen items Insurance companies, checking on potential multiple use of the same diamond as collateral for different loans Jewelers for buy-ins Law enforcement agencies E. Diamond Lending Platform The development of a general lending or peer-to-peer lending platform in the diamond industry to compensate for the diminishing interest by traditional banks, due to the current lack of transparency in the diamond sector.

F. CVD Digital Thumbnail

Blockchain registration of synthetic diamonds or CVD's (Carbon Vaporized Diamonds)

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion. For example, the laser writing wavelengths in these examples is 515 nm, but it could be more or less in embodiments of the invention.

Example 1

Laser writing wavelength 515 nm,
Repetition rate 500 kHz,
Focusing objective 1.25 NA (100×)
CVD optical grade diamond
Write dots instead of continuous lines
Pulse number per dot: 10000 to single pulse
Pulse energies: 100-300 nJ
Depth: ~200 mm
Results/Conclusions
Faint dots fabricated with single pulse of 216 nJ pulse energy at a depth of 200 mm was achieved.

Attempt slightly lower energy in subsequent experiment to create barely visible (invisible) marks at 40× (10×)

Example 2

Laser writing wavelength 515 nm,
Repetition rate 500 kHz,
Focusing objective 1.25 NA (100×)
CVD optical grade diamond
Single pulse
Pulse energies: 20-200 nJ
Depth: 60 mm
Results/Conclusions:
Pulse energies from 94 nJ to 140 nJ visible with 40× but invisible with 10×
Minimum spacing 2 mm between dots
Smaller spacings lead to overlap and thus, dark spots
Static exposure in diamond using single laser pulse of appropriate pulse energy (94 nJ to 140 nJ) was successful in creating faint modifications completely invisible through a 10× objective but faintly visible under 40× objective

Example 3

Laser writing wavelength 515 nm,
Repetition rate 500 kHz,
Focusing objective 1.25 NA (100×)
CVD optical grade diamond (7.5 mm×7.5 mm)
Pulse numbers: single pulse
Pulse energy: 120 nJ
Depth: ~50 mm
Results/Conclusions:
Except for few spots resulting in tiny dark spots, rest of the dots are extremely faint even at 40× magnification
The dots cannot be seen with 10× magnification
Further improvement in the digit recognition at 40× magnification can be performed by adding more dots to frame a digit Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification, including in the Background of the Invention section, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:
1. A method of tokenization and use of assets, comprising:
a) tagging at least one asset prior to registering;
wherein the tagging, comprises: modifying the at least one asset with a laser beam from a laser system using gentle modification with a pulse energy between 10 nJ and 300 nJ, an identification etching which is imperceptible at 10× optical magnification but visible to high magnification optical viewing methods;

b) registering the at least one asset on a distributed ledger; wherein the registering the at least one asset comprises: communicating and registering information related to the identification etching on the distributed ledger;
c) assigning the at least one asset a fungible or non-fungible token with a public key;
d) reading information about the at least one asset using a reading device;
e) verifying ownership of the at least one asset using a private key which matches the public key; and,
f) performing a transaction with the at least one asset.

2. The method according to claim 1, further comprising rating an individual or entity responsible for tagging the at least one asset based on at least one of trustworthiness, accuracy and honesty.

3. The method according to claim 1, wherein the non-fungible token includes information related to at least one of the at least one asset's characteristics, ownership, provenance, location and past transactions.

4. The method according to claim 3, wherein ownership information includes fractional ownership of the at least one asset.

5. The method according to claim 1, wherein a transaction includes primary purchases of the at least one asset, secondary market trading of the at least one asset, collateralized lending, insurance, law enforcement, verification of the at least one asset and certification of the at least one asset.

6. The method according to claim 1, wherein the reading is performed in the performance of a transaction including primary and secondary sales, use as collateral, monetization, investment, insurance, finance, logistics, chain of custody, verification, validation, certification, grading, law enforcement, brand enforcement, asset theft prevention, counterfeiting protection, asset recover, commoditization, and trading.

7. The method of claim 1, wherein modification of the asset consists of multi-photon absorption by the asset.

8. The method of claim 1, wherein modifying the asset with the laser to create the identification etching within the asset includes operating the laser at a wavelength such that the photon energy is less than the bandgap energy of the material to ensure nonlinear absorption.

9. The method of claim 1, wherein modifying the asset with the laser to create the identification etching within the asset includes creating the identification etching using a wavelength is in the range of 1020-1050 nm or is in the second harmonic wavelength in the range of 510 to 525 nm.

10. The method of claim 1, wherein modifying the asset with the laser to create the identification etching within the asset includes tagging the asset with a laser using microscope having an objective with a numerical aperture between 0.25 and 1.5 to create the identification etching within the asset.

11. The method of claim 1, wherein modifying the asset with the laser to create the identification etching within the asset includes creating a localized two or three dimensional modification within a depth between 100 microns to 200 microns, or between 200 microns to 500 microns of below a surface of the asset.

12. The method of claim 1, wherein modifying the asset with the laser to create the identification etching within the asset includes forming a two-dimensional or three-dimensional pattern from voxels having a width of less than 1 micron.

13. The method of claim 1, wherein modifying the asset with the laser to create the identification etching within the asset includes forming a two-dimensional or three-dimensional pattern or graphic design.

14. The method of claim 1, wherein modifying the asset with the laser to create the identification etching within the asset includes forming a two-dimensional or three-dimensional pattern indicative of a numerical code, text, a graphic, a logo, or a pattern associated with a particular company.

15. The method of claim 1, wherein modifying the asset with the laser to create the identification etching within the asset includes forming a two-dimensional or three-dimensional pattern indicative of a current physical location or a past physical location of the asset.

16. The method of claim 1, wherein modifying the asset with the laser to create the identification etching within the asset includes forming a two-dimensional or three-dimensional pattern indicative of a current owner or past owner of the asset.

17. The method of claim 1, wherein modifying the asset with the laser to create the identification etching within the asset includes forming a two-dimensional or three-dimensional pattern indicative of a previous transaction involving grading details or certification details associated with the asset.

* * * * *